United States Patent
Miyake et al.

(10) Patent No.: US 7,948,379 B2
(45) Date of Patent: May 24, 2011

(54) OPTICAL DISK RECORDING AND REPRODUCING APPARATUS, REMOTE CONTROLLER, AND CONTENT MANAGEMENT METHOD

(75) Inventors: Kunihiko Miyake, Kanagawa (JP);
Shinichiro Iimura, Tokyo (JP);
Nobuhiko Tsukahara, Kanagawa (JP);
Sunao Aoki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1154 days.

(21) Appl. No.: 11/182,879

(22) Filed: Jul. 18, 2005

(65) Prior Publication Data

US 2006/0013094 A1    Jan. 19, 2006

(30) Foreign Application Priority Data

Jul. 16, 2004   (JP) .................. 2004-210355

(51) Int. Cl.
*G08B 13/14*   (2006.01)
(52) U.S. Cl. .................... 340/572.1; 340/10.1
(58) Field of Classification Search .......... None
See application file for complete search history.

(56) References Cited

U.S. PATENT DOCUMENTS

| 7,363,642 B2 * | 4/2008 | Oshima et al. ............... 720/718 |
| 2004/0064630 A1 * | 4/2004 | Nakashika ........................ 711/4 |

FOREIGN PATENT DOCUMENTS

| JP | 2002-163613 | | 6/2002 |
| JP | 2002-0163613 | * | 6/2002 |
| JP | 2005-116077 | | 4/2005 |

* cited by examiner

*Primary Examiner* — Daniel Wu
*Assistant Examiner* — Brian Wilson
(74) *Attorney, Agent, or Firm* — Oblon, Spivak, McClelland, Maier & Neustadt, L.L.P.

(57) ABSTRACT

Disclosed are an optical disk recording and reproducing apparatus, a remote controller, and a content management method capable of allowing a user to easily confirm contents recorded on an optical disk, wherein an optical disk is integrally provided with a read-only RFID tag that records only a disk ID to identify the optical disk as an individual. When a content is recorded on the optical disk, a video recorder records disk management information including the disk ID of the optical disk and index information about the content. After the content is recorded, a remote controller noncontactly reads the disk ID from the RFID tag of the optical disk and transmits the disk ID to the video recorder. The video recorder extracts index information corresponding to the received disk ID from the disk management information and displays the index information in a list.

11 Claims, 12 Drawing Sheets

FIG. 7

| DISK ID | RECORDING DATE | PROGRAM TITLE | RECORDING DATE |
|---------|----------------|---------------|----------------|
| A2017 | 2004/06/03 | Baseball(*** vs ***) | 1 |
| ... | 2004/05/25 | Soccer(*** vs ***) | 1 |
| A2017 | 2003/12/10 | Drama「*****」 | 0 |
| ⋮ | ⋮ | ⋮ | ⋮ |

OPTICAL DISK RECORDING AND REPRODUCING APPARATUS, REMOTE CONTROLLER, AND CONTENT MANAGEMENT METHOD

CROSS REFERENCES TO RELATED APPLICATIONS

The present invention contains subject matter related to Japanese Patent Application JP 2004-210355 filed in the Japanese Patent Office on Jul. 16, 2004, the entire contents of which being incorporated herein by reference.

BACKGROUND OF THE INVENTION

1. Field of the Invention

The present invention relates to an optical disk recording and reproducing apparatus, a remote controller for this optical disk recording and reproducing apparatus, and a content management method using these. More specifically, the present invention relates to an optical disk recording and reproducing apparatus, a remote controller, and a content management method capable of allowing a user to easily confirm contents recorded on an optical disk.

2. Description of Related Art

In recent years, there have been developed and used various types of optical disks such as music CD (Compact Disc), CD-R (Recordable)/RW (ReWritable), DVD-ROM (Digital Versatile Disk-Read Only Memory), DVD±R/RW, and Blu-ray Disc. At the same time, there is a spreading use of such apparatuses as universal disk players and DVD recorders that can use various types of optical disks and perform reproduction and recording in a standalone fashion.

These apparatuses use various types of optical disks as mentioned above and may need to determine the type of a mounted optical disk. Accordingly, considerable time is spent between mounting an optical disk and starting to record or reproduce its content. There has been a problem of user unfriendliness.

Recently, it is a general practice to record contents such as video on optical disks using DVD recorders and personal computers (PCs). When using a recordable optical disk, for example, a user can handwrite or print details of the recorded contents on the disk's label surface or a sheet inside the case. It is very cumbersome for the user to handwrite or print the recording contents each time he or she records contents on a disk. The only possible alternative to confirm details of the recorded contents may be to actually mount an optical disk on a recorder or a player, reproduce recorded data, and display a menu screen to select the contents, for example. Consequently, as mentioned above, considerable time is spent between mounting the optical disk and making it ready for reproduction. It takes a long time to find the content the user wants to enjoy out of many optical disks, degrading the usability.

A system is proposed to solve such problem (e.g., see patent document 1). The system provides a noncontact storage device integrally with a recording medium for contents so that the storage device stores information about the content. A remote controller is used to noncontactly read the information from the storage device and display the information. The storage device may represent a so-called RFID (Radio Frequency Identification) tag using a semiconductor chip, for example.

[Patent document] JP-A No. 67842/2001 (paragraphs [0023] to [0054], FIG. 1)

SUMMARY OF THE INVENTION

As described in patent document 1, the storage device stores information about the contents recorded on an optical disk. For this purpose, the storage device needs to have the capacity large enough to store the information about the contents and have capability to write once or repeatedly. Providing a rewritable optical disk with such storage device increases manufacturing costs and the price of the optical disk. This method may be inappropriate and unacceptable for users who will purchase many optical disks.

The present invention has been made in consideration of the foregoing. There is a need for providing an optical disk recording and reproducing apparatus that can allow a user to promptly confirm details of contents recorded on a low-cost optical disk without reproducing details of the contents in the apparatus.

There is another need for providing a remote controller for an optical disk recording and reproducing apparatus that can allow a user to promptly confirm contents recorded on a low-cost optical disk without reproducing details of the contents in the apparatus.

There is yet another need for providing a content management method that can allow a user to promptly confirm contents recorded on a low-cost optical disk without reproducing details of the contents in the apparatus.

According to an embodiment of the present invention, there is provided an optical disk recording and reproducing apparatus to record and reproduce data using an optical disk comprising: management information storage means for storing disk management information to maintain correspondence between individual identification information about the optical disk and index information indicating details of a content recorded on the optical disk, wherein the individual identification information is recorded in an RFID tag integrally provided for the optical disk; identification information read means for noncontactly reading the individual identification information from the RFID tag of the externally available optical disk; and display process means for extracting the index information from the disk management information, wherein the index information corresponds to the individual identification information read by the identification information read means, and outputting an image signal to display the extracted index information on a screen.

Such optical disk recording and reproducing apparatus uses the identification information read means to read the individual identification information about an optical disk available outside the apparatus. The index information corresponding to the individual identification information is extracted based on the disk management information recorded in the apparatus and is notified to a user by means of a screen display.

It may be preferable to further provide identification information internal read means for noncontactly reading the individual identification information from the RFID tag of the optical disk inserted into an inside of the optical disk recording and reproducing apparatus. When a content is recorded on the optical disk, it may be preferable to register the index information about the content and the individual identification information about the optical disk, wherein the individual identification information is read by the identification information internal read means, correspondingly to each other to the disk management information.

There may be further provided broadcast reception means for receiving a content by means of a broadcast radio wave and broadcast information acquisition means for acquiring information indicating a broadcast time and details of a content. When a content received by the broadcast reception means is to be recorded on the optical disk, it may be preferable to generate the index information based on information about the content acquired by the broadcast information acquisition means and register the index information to the disk management information.

Another embodiment of the present invention provides an optical disk recording and reproducing apparatus to record and reproduce data using an optical disk comprising: management information storage means for storing disk management information to maintain correspondence between individual identification information about the optical disk and index information indicating details of a content recorded on the optical disk, wherein the individual identification information is recorded in an RFID tag integrally provided for the optical disk; signal reception means for receiving a wireless signal from an external remote controller which remotely controls operations of the optical disk recording and reproducing apparatus; and display process means for receiving the individual identification information read by the remote controller from the RFID tag on the optical disk by way of the signal reception means, extracting the index information corresponding to the individual identification information from the disk management information, and outputting an image signal to display the extracted index information on a screen.

Such optical disk recording and reproducing apparatus uses the remote controller to read and transmit the individual identification information about an optical disk available outside the apparatus. The index information corresponding to the received individual identification information is extracted based on the disk management information recorded in the optical disk recording and reproducing apparatus and is notified to a user by means of a screen display.

There may be further provided identification information internal read means for noncontactly reading the individual identification information from the RFID tag of the optical disk inserted into an inside of the optical disk recording and reproducing apparatus. When a content is recorded on the optical disk, it may be preferable to register the index information about the content and the individual identification information about the optical disk, wherein the individual identification information is read by the identification information internal read means, correspondingly to each other to the disk management information.

There may be further provided broadcast reception means for receiving a content by means of a broadcast radio wave and broadcast information acquisition means for acquiring information indicating a broadcast time and details of a content. When a content received by said broadcast reception means is to be recorded on said optical disk, it may be preferable to generate said index information based on information about said content acquired by said broadcast information acquisition means and register said index information to said disk management information.

Still another embodiment of the present invention provides an optical disk recording and reproducing apparatus to record and reproduce data using an optical disk comprising: management information storage means for storing disk management information to maintain correspondence between individual identification information about the optical disk and index information indicating details of a content recorded on the optical disk, wherein the individual identification information is recorded in an RFID tag integrally provided for the optical disk; wireless communication means for performing wireless communication with an external remote controller which remotely controls operations of the optical disk recording and reproducing apparatus; and information retrieval means for receiving the individual identification information read by the remote controller from the RFID tag on the optical disk by way of the wireless communication means, extracting the index information corresponding to the individual identification information from the disk management information, and allowing the wireless communication means to transmit the extracted index information to the remote controller.

Such optical disk recording and reproducing apparatus uses the remote controller to read and transmit the individual identification information about an optical disk available outside the apparatus. The index information corresponding to the received individual identification information is extracted based on the disk management information recorded in the optical disk recording and reproducing apparatus and is returned to the remote controller. The returned index information can be displayed on the remote controller's screen and can be notified to a user.

There may be further provided identification information internal read means for noncontactly reading said individual identification information from said RFID tag of said optical disk inserted into an inside of said optical disk recording and reproducing apparatus. When a content is recorded on said optical disk, it may be preferable to register said index information about said content and said individual identification information about said optical disk correspondingly to each other to said disk management information, wherein said individual identification information is read by said identification information internal read means.

There may be further provided broadcast reception means for receiving a content by means of a broadcast radio wave and broadcast information acquisition means for acquiring information indicating a broadcast time and details of a content. When a content received by the broadcast reception means is to be recorded on the optical disk, it may be preferable to generate the index information based on information about the content acquired by the broadcast information acquisition means and register the index information to the disk management information.

Yet another embodiment of the present invention provides a remote controller which uses wireless communication to remotely control operations of an optical disk recording and reproducing apparatus for recording and reproduction of an optical disk, the remote controller comprising: identification information read means for noncontactly reading individual identification information about the optical disk from an RFID tag integrally provided for the optical disk; and identification information transmission means for wirelessly transmitting the individual identification information read by the identification information read means to the optical disk recording and reproducing apparatus.

Such remote controller allows the identification information read means to read individual identification information about an optical disk available outside the optical disk recording and reproducing apparatus. The identification information transmission means wirelessly transmits the individual identification information to the optical disk recording and reproducing apparatus. This makes it possible to extract the index information corresponding to the individual identification information based on the disk management information recorded in the optical disk recording and reproducing apparatus and notify the user of the index information by means of a screen display on the apparatus or the remote controller.

According to an embodiment of the present invention, a user can confirm the index information about contents recorded on an optical disk without inserting it into the optical disk recording and reproducing apparatus and reproducing the optical disk. The user can fast find the optical disk that records an intended content. The optical disk is integrally provided with the RFID tag. The RFID tag just needs to store only the individual identification information and function as read only. It is possible to suppress the optical disk's manufacturing costs and improve the usability at the same time.

There is further provided the identification information internal read means for noncontactly reading the individual identification information from the RFID tag of the optical disk inserted into an inside of the optical disk recording and reproducing apparatus. When a content is recorded on the optical disk, it is possible to register the index information about the content and the individual identification information about the optical disk correspondingly to each other to the disk management information, wherein the individual identification information is read by the identification information internal read means. In this manner, it becomes possible to fast confirm the index information about contents recorded on all optical disks that record contents using the optical disk recording and reproducing apparatus.

There are further provided the broadcast reception means for receiving a content by means of a broadcast radio wave and the broadcast information acquisition means for acquiring information indicating a broadcast time and details of a content. When a content received by the broadcast reception means is to be recorded on the optical disk, the index information is generated based on information about the content acquired by the broadcast information acquisition means and is registered to the disk management information. With respect to contents received by means of broadcast radio wave, it is possible to automatically generate the index information and store it inside the optical disk recording and reproducing apparatus, thus further improving the usability.

Other and further objects, features and advantages of the invention will appear more fully from the following description.

BRIEF DESCRIPTION OF THE DRAWINGS

FIG. 7 exemplifies a data structure of disk management information;

DETAILED DESCRIPTION OF THE PREFERRED EMBODIMENTS

Embodiments of the present invention will be described in further detail with reference to the accompanying drawings.

First Embodiment

Figure 1:
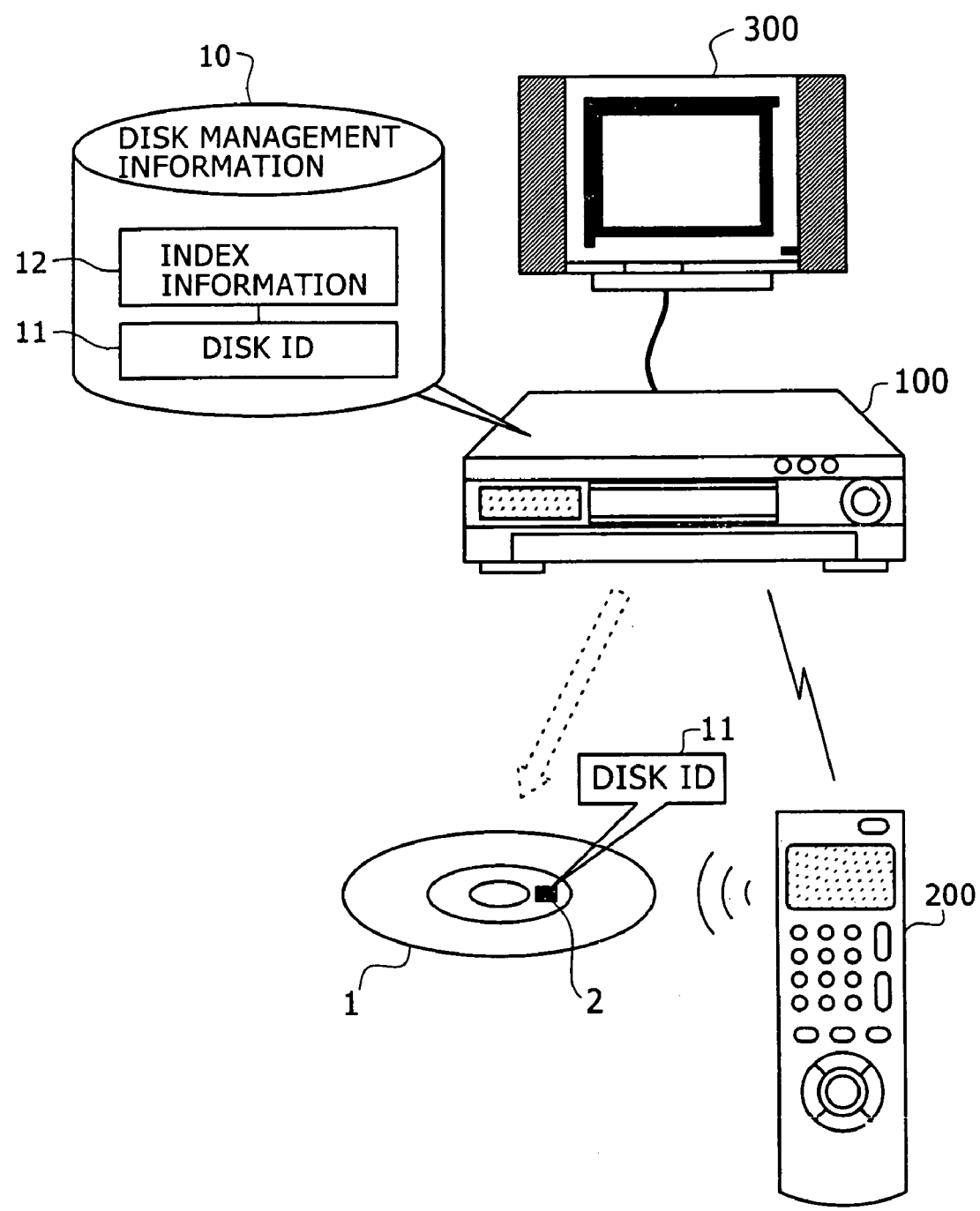
FIG. 1 shows a system configuration of a first embodiment.

FIG. 1 shows a system configuration of a first embodiment.

FIG. 1 shows a content management system to manage contents (e.g., video contents received from a broadcast according to the embodiment) recorded by a video recorder 100 on an optical disk 1. The content management system includes the video recorder 100 and a remote controller 200. The video recorder 100 receives broadcast contents and records them on a recording medium. The remote controller 200 is used to remotely operate the video recorder 100.

The video recorder 100 receives broadcast contents and records them as digital data on a recording medium. The video recorder 100 can use at least the writable optical disk 1 as a recording medium. The video recorder 100 can record or reproduce contents on a plurality of types of the optical disk 1 such as DVD±R, DVD±RW, Blu-ray Disc, and music CD. According to the embodiment, the video recorder 100 contains a relatively large-capacity HDD and can record contents on not only the optical disk 1, but also the HDD. The video recorder 100 connects with a television (TV) receiver to display reproduced video of the content.

The optical disk 1 used on the video recorder 100 is integrally provided with an RFID tag 2 exclusively used to read data. The RFID tag 2 records a unique disk ID 11 in an unrewritable manner to identify the optical disk 1 as an individual. The video recorder 100 has a function to read data from the RFID tag 2 on the optical disk 1 inserted into the video recorder 100.

The remote controller 200 has a function to use the infrared communication, for example, to transmit a control signal corresponding to an input operation to the video recorder 100 and control its operations. Further, the remote controller 200 has a function to noncontactly read data from the RFID tag 2 on the optical disk 1.

In this content management system, the video recorder 100 records contents on the optical disk 1 and by itself manages all the contents on the basis of the optical disk 1. For this purpose, the video recorder 100 maintains disk management information 10 composed of the disk ID 11 and index information 12 about the content stored on the corresponding optical disk 1. The video recorder 100 accumulates data in the disk management information 10 each time it records a content.

Specifically, the embodiment makes it possible to use the remote controller 200 to read the disk ID 11 from the optical disk 1 that records a content. The read disk ID 11 can be transferred to the video recorder 100. The video recorder 100 extracts the index information 12 corresponding to the received disk ID 11 from the disk management information 10 and displays the index information 12 in a list format on a screen of the TV receiver 300. In this manner, a user can confirm contents recorded on the optical disk 1 without mounting the optical disk 1 on the video recorder 100 and reproducing the optical disk 1. The user can fast find the optical disk 1 that records an intended content.

The following describes internal configurations of the apparatuses in the above-mentioned content management system.

Figure 2:
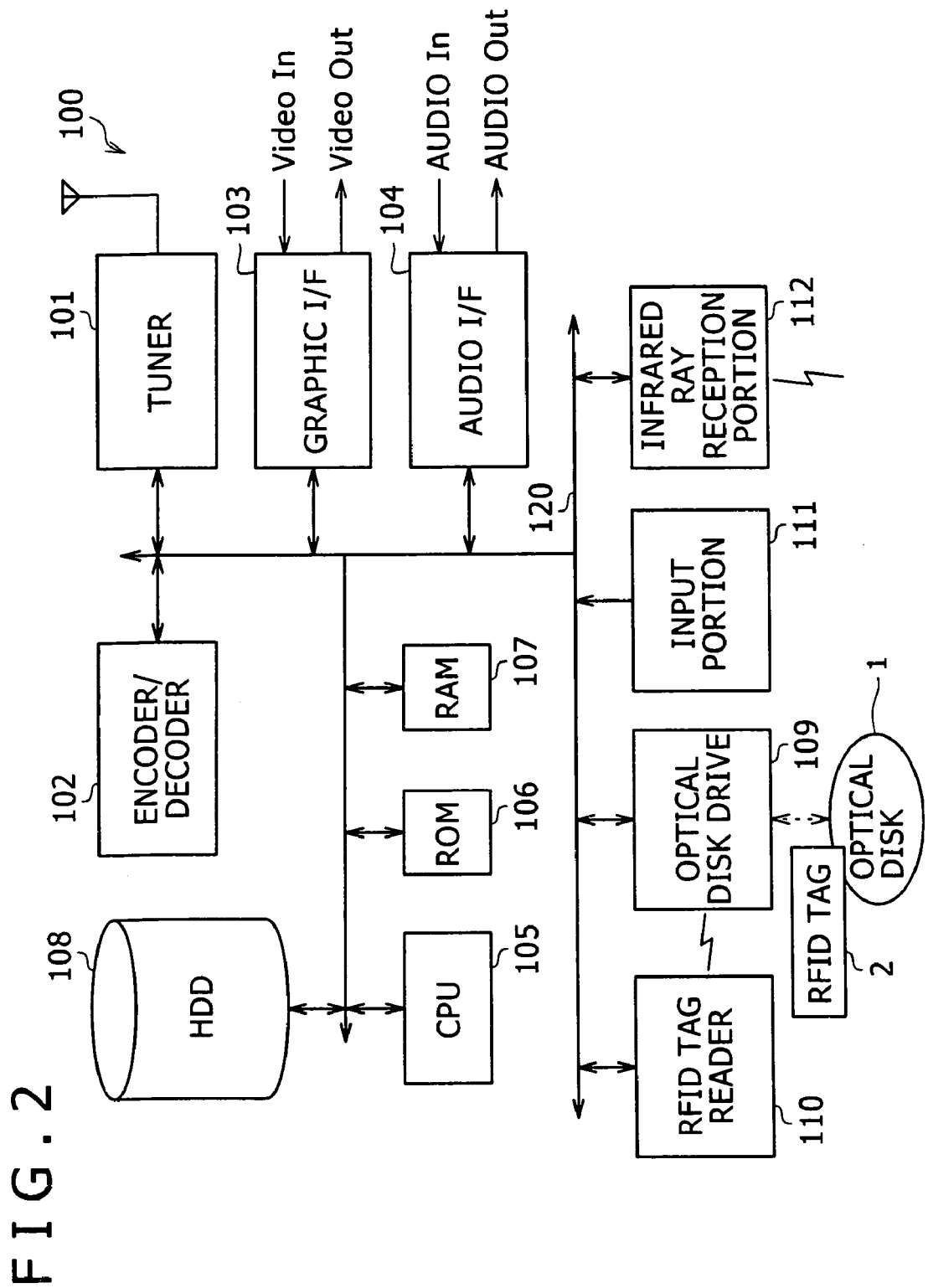
FIG. 2 is a block diagram showing an internal configuration of a video recorder according to the first embodiment.

FIG. 2 is a block diagram showing an internal configuration of the video recorder 100.

As shown in FIG. 2, the video recorder 100 is composed of a tuner 101, an encoder/decoder 102, a graphic interface (I/F) 103, an audio I/F 104, a CPU (Central Processing Unit) 105, ROM 106, RAM 107, an HDD 108, an optical disk drive 109, an RFID tag reader 110, an input portion 111, and an infrared ray reception portion 112. The video recorder 100 is configured so that the CPU 105 connects to the components in the apparatus via an internal bus 120 and provides the components with overall control.

For example, the tuner 101 is a block to receive digital broadcasts. The tuner 101 is supplied with a broadcast wave received at an external antenna and selects a signal with a specified carrier frequency corresponding to an instruction from the CPU 105. The tuner 101 applies QPSK (Quadrature Phase Shift Keying) demodulation and error correction processes to the selected reception signal. The tuner 101 separates video and audio streams from a processed transport stream and transfers them to the encoder/decoder 102, the HDD 108, and the optical disk 109 according to an instruction from the CPU 105. The tuner 101 can also separate additional information for broadcasting such as the EPG (Electronic Program Guide) from the transport stream and transfer it to the CPU 105.

The encoder/decoder 102 uses the MPEG (Moving Picture Experts Group) system and compresses to encode and decompresses to decode video and audio data. For example, the encoder/decoder 102 decodes video and audio encoded data supplied from the tuner 101, the HDD 108, and the optical disk drive 109. The encoder/decoder 102 then outputs the processed video and audio data to the graphic I/F 103 and the audio I/F 104, respectively. When the tuner 101 can receive analog broadcast signals, the encoder/decoder 102 can encode a received analog broadcast signal according to the MPEG system and transfer the generated coded data to the HDD 108 and the optical disk for recording.

The graphic I/F 103 converts video data decoded in the encoder/decoder 102 into an analog signal, for example, and outputs it to the external TV receiver 300, for example. In this case, it may be preferable to be able to synthesize the decoded video data with OSD (On Screen Display) image data such as GUI (Graphical User Interface) images generated from a process of the CPU 105. The audio I/F 104 converts audio data decoded in the encoder/decoder 102 into an analog signal, for example, and outputs it to the TV receiver 300 or audio equipment.

The CPU 105 executes programs stored in the ROM 106 and the HDD 108 to provide overall control for the portions in the video recorder 100. The ROM 106 prestores an OS (Operating System), a BIOS (Basic Input/Output System), application programs, and the other various data. The RAM 107 temporarily stores at least part of a program executed by the CPU 105 or various data necessary for program processes.

The HDD 108 is a relatively large-capacity storage device of 100 GBytes, for example, and is capable of recording data for long-time video contents. The HDD 108 writes and reads data based on commands and address information specified from the CPU 105. The HDD 108 records content data and additional information for data broadcasting. The HDD 108 may store programs executed by the CPU 105 and data necessary for program execution.

The optical disk 1 is mounted on the optical disk drive 109. The optical disk drive 109 reads and writes data from the optical disk 1.

The RFID tag reader 110 noncontactly reads recorded data from the RFID tag 2 provided on the optical disk 1 mounted on the optical disk drive 109 and transfers the read data to the CPU 105.

The input portion 111 is equipped with keys for a user to operate and supplies the CPU 105 with a control signal corresponding to the user's input operation. The infrared ray reception portion 112 receives an infrared signal transmitted from the remote controller 200 and supplies the CPU 105 with a control signal corresponding to the received signal.

Figure 3:
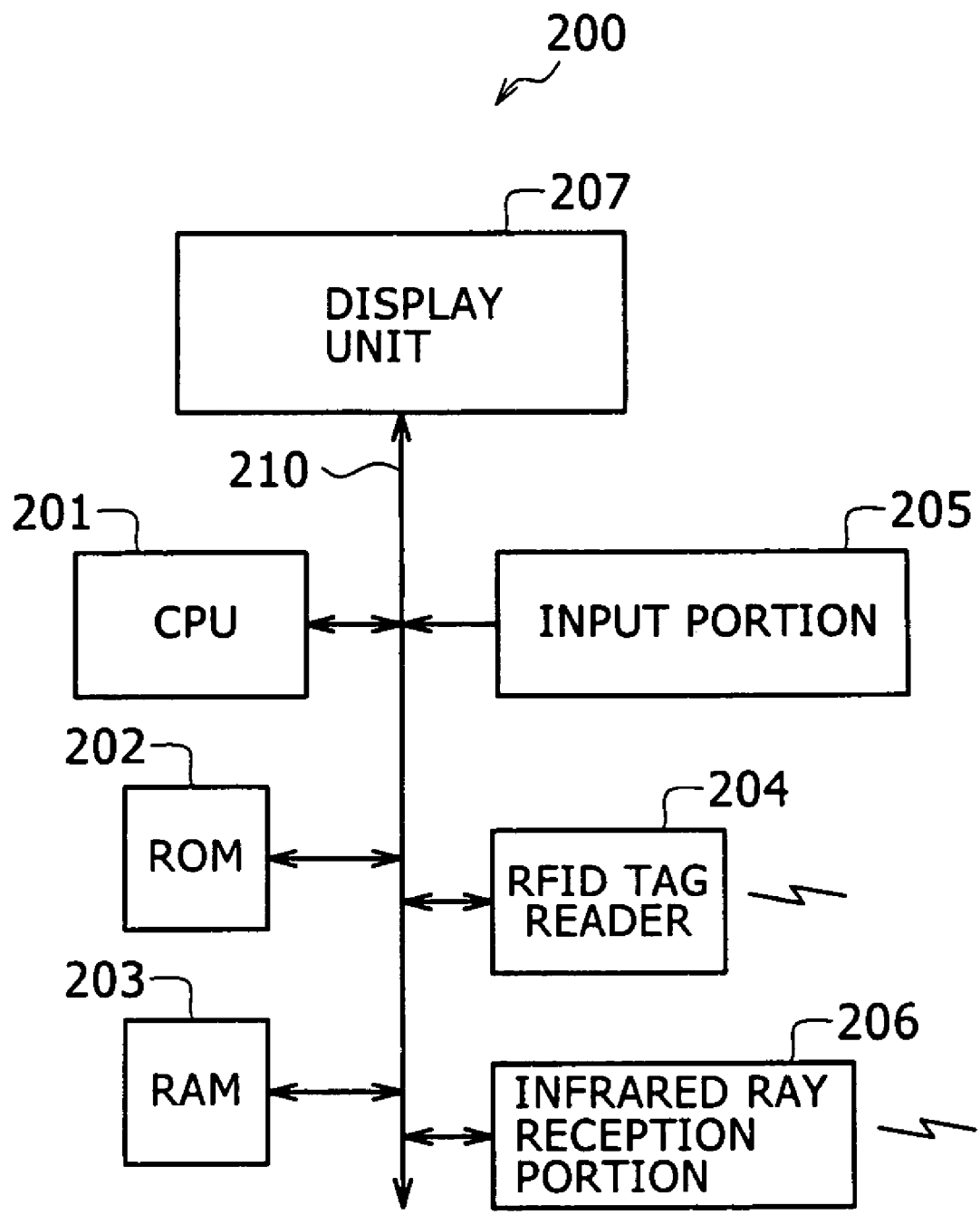
FIG. 3 is a block diagram showing an internal configuration of a remote controller according to the first embodiment.

FIG. 3 is a block diagram showing an internal configuration of the remote controller 200.

As shown in FIG. 3, the remote controller 200 has CPU 201, ROM 202, RAM 203, an RFID tag reader 204, an input portion 205, an infrared ray transmission portion 206, and a display portion 207. The remote controller 200 is constructed as follows. The CPU 201 connects with components in the apparatus via an internal bus 210 and executes a program stored in the ROM 202 and the like to provide overall control for the components. The RAM 203 temporarily stores at least part of a program executed by the CPU 201 or various data necessary for program processes.

The RFID tag reader 110 noncontactly reads recorded data from the RFID tag 2 provided on the optical disk 1 and transfers the read data to the CPU 201. The input portion 205 is equipped with keys for a user to operate and supplies the CPU 201 with a control signal corresponding to the user's input operation. The infrared ray transmission portion 206 generates an infrared signal corresponding to the control signal supplied from the CPU 201. The display portion 207 has an LCD (Liquid Crystal Display) as a display device, for example, and displays images and characters based on the image data supplied from the CPU 201.

Figure 4:
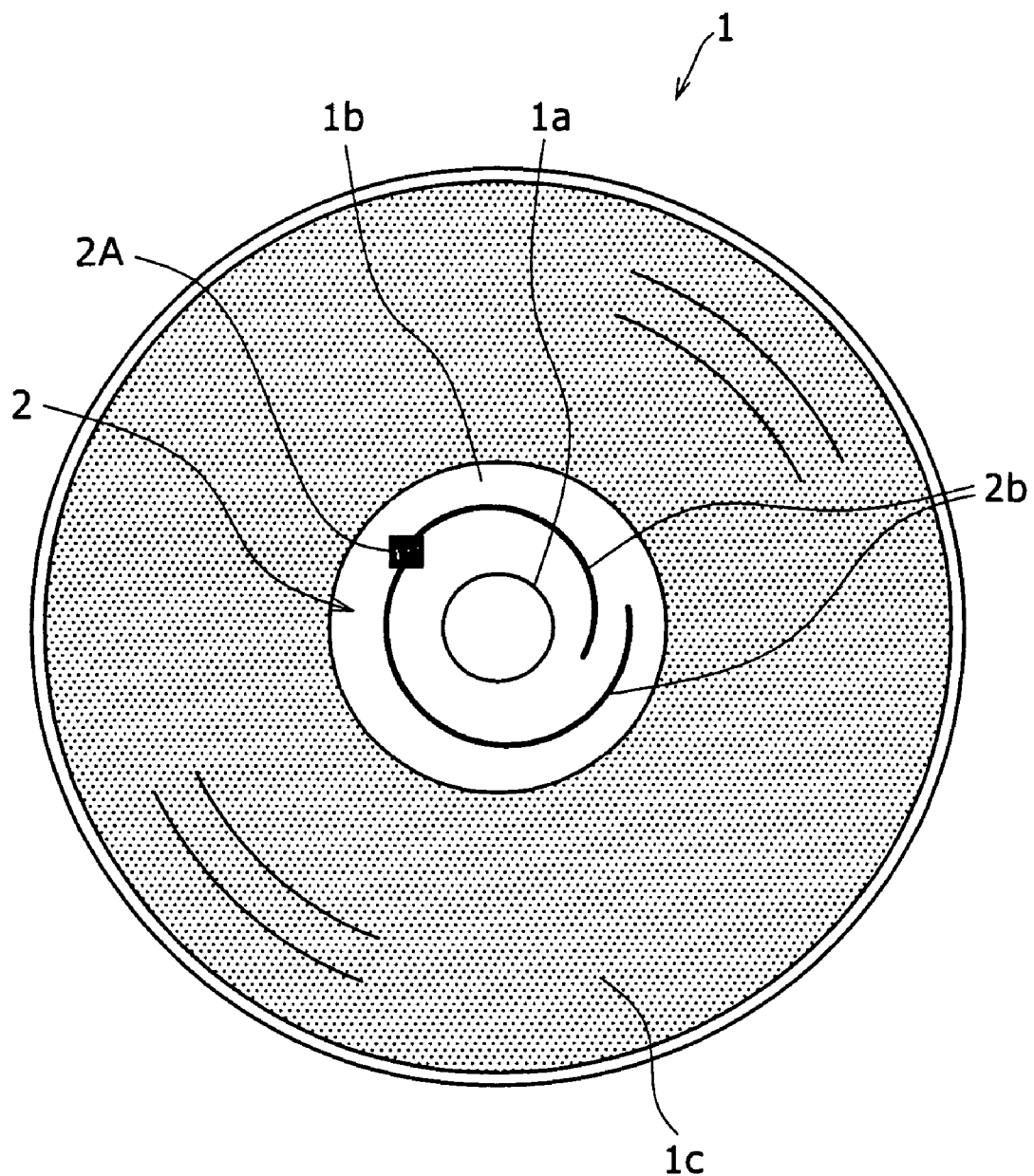
FIG. 4 is a plan view showing an overall configuration of an optical disk used for the embodiment.

FIG. 4 is a plan view showing an overall configuration of the optical disk 1.

As shown in FIG. 4, a data recording layer 1c is formed on a side of the optical disk 1 except a peripheral portion 1b around a center hole 1a. Data is recorded on the data recording layer 1c in such a manner that a relatively high-output laser beam is radiated to form a pit. Data can be read in such a manner that a relatively low-output laser beam is radiated to the data recording layer 1c and the presence or absence of a pit is determined according to the amount of reflected light.

The optical disk 1 used for the embodiment is mounted with a semiconductor memory chip 2a and an antenna 2b for the RFID tag 2 on the peripheral portion 1b around the center hole 1a. There are formed, although not shown, a semiconductor memory circuit, a control circuit, and the like in the semiconductor memory chip 2a. The semiconductor memory circuit stores the disk ID 11 of the optical disk 1 in advance. The control circuit is used to read data from the semiconductor memory circuit and to generate power. The RFID tag 2 is read-only, has no power supply, and operates by generating the power based on radio waves received from the reader. The coiled antenna 2b is provided on the peripheral portion 1b to transmit and receive radio waves. For example, the antenna 2b is coiled by using the etching technique to remove an unnecessary portion from a conductive layer laminated on an insulating substrate sheet of the disk itself.

The disk ID 11 is composed of several tens of bits of data and provides a very small capacity necessary for the RFID tag 2. The RFID tag 2 just needs to be constructed to be read-only and therefore can be manufactured at very low costs. Even when the RFID tag 2 is integrated with the optical disk 1, an increase in the manufacturing cost can be minimized.

The following details processes of the apparatuses according to the embodiment.

Figure 5:
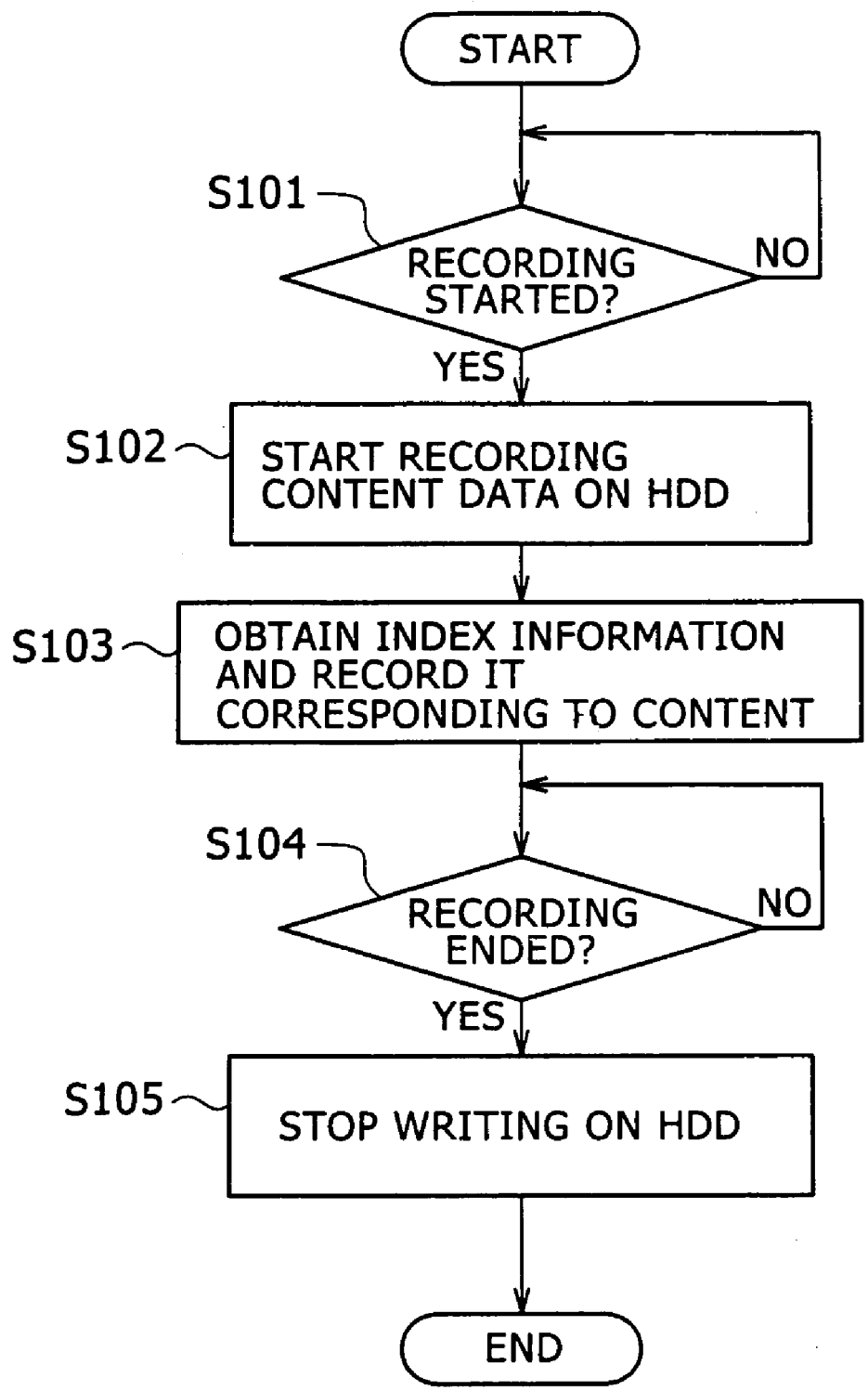
FIG. 5 is a flowchart showing a flow of process in a video recorder to record contents on an HDD.

FIG. 5 is a flowchart showing a flow of process in the video recorder 100 to record contents on the HDD.

[Step S101] The process determines whether or not the start of recording is instructed. When the result is affirmative, the process proceeds to Step S102. For example, the start of recording is enabled in accordance with the user's input operation or based on recording reservation information preset by the user.

[Step S102] The process starts writing content data on the HDD 108. When recording broadcast contents, the tuner 101 selects a reception signal with a carrier frequency specified by a user operation or recording reservation information. The tuner 101 applies demodulation and error correction processes to the reception signal. The tuner 101 separates video or audio streams from the processed transport stream and sequentially transfers them to the HDD 108. The HDD 108 sequentially records the transferred streams.

When the tuner 101 can receive analog broadcast signals, the received video/audio signals are converted into digital data. The encoder/decoder 102 compresses to encode the digital data according to MPEG. The data is recorded as video and audio streams on the HDD 108.

[Step S103] The process obtains the index information 12 for the content being recorded based on the EPG and the recording reservation information. The process records the index information 12 corresponding to the content on a specified area in the HDD 108. When the recording starts in response to a user operation, for example, the EPG can be obtained through a data broadcast channel received by the tuner 101. During analog broadcast recording, the EPG can be obtained from a VBI (Vertical Blanking Interval) region for the analog broadcast. The process extracts program titles and the like from the obtained EPG and records it along with a recording start time and the like as the index information 12.

The recording reservation information can be configured based on the information in the EPG that is obtained as mentioned above. When the recording reservation information is configured, for example, the screen displays a list of the EPG that is obtained as mentioned above. The user can select a program to be reserved from the list and preset the program. At this time, a program title and the like may be recorded along with the recording time in the recording reservation information. At Step S103, the process can obtain the index information 12 from the recording reservation information.

The index information 12 recorded at this step can be used to list program titles so as to confirm contents recorded in the HDD 108 or select a content to be reproduced.

[Step S104] The process determines whether or not the end of recording is instructed. The process continuously records content data on the HDD 108 until the end of recording is instructed. When the end of recording is instructed according to a user operation or based on the recording reservation information, the process proceeds to Step S105.

[Step S105] The process stops writing content data on the HDD 108.

In the above-mentioned flowchart, there has been described the case of recording broadcast contents received from the tuner 101 on the HDD 108. For example, it may be preferable to record data streams based on video and audio signals input via the graphic I/F 103 and the audio I/F 104 on the HDD 108. In this case, it may be preferable to be able to input, for example, program titles in the index information 12 in accordance with user operations after recording. When a broadcast content is received, it may be preferable to be able to add or edit the index information 12 in accordance with user operations after recording.

Figure 6:
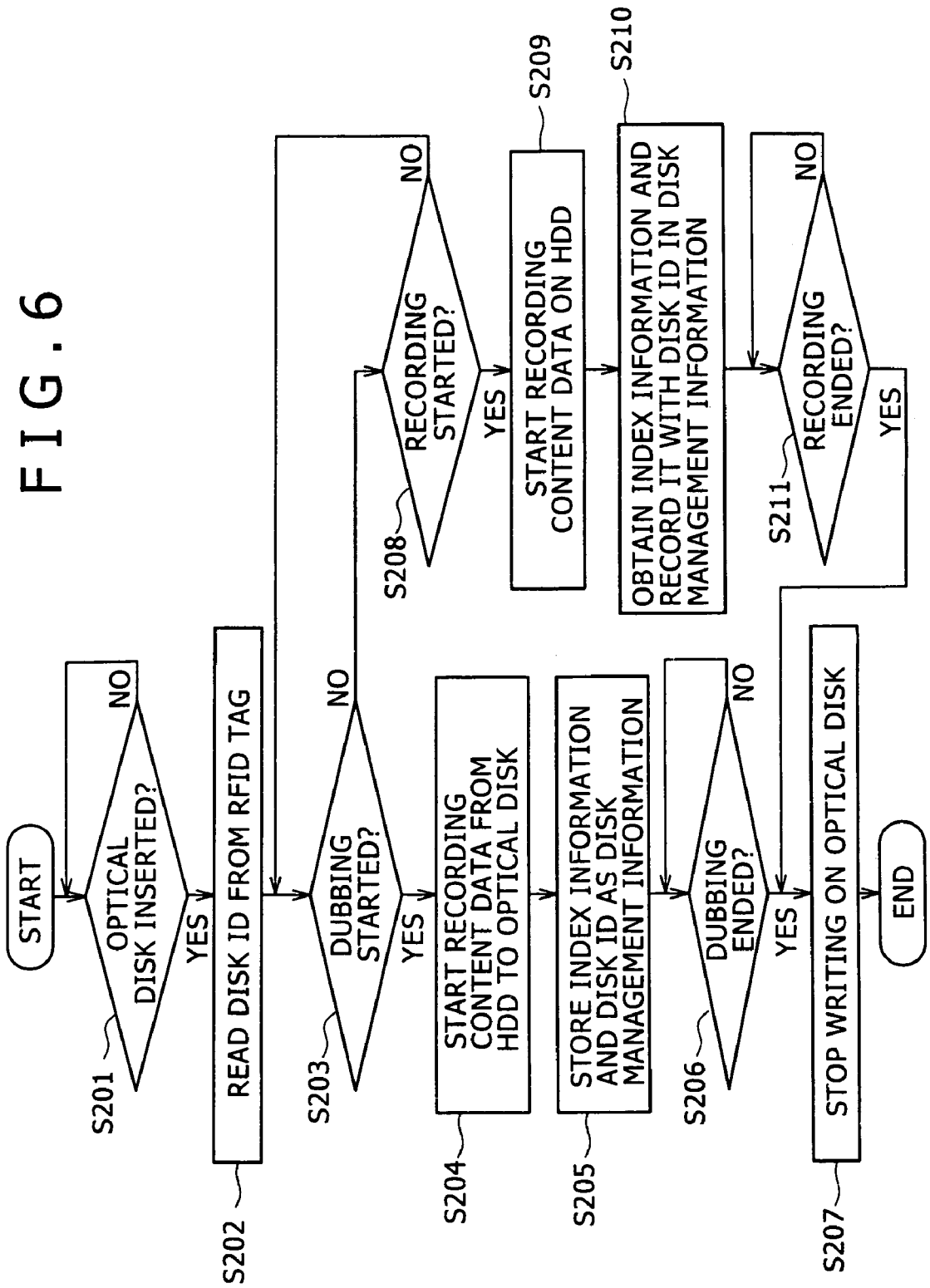
FIG. 6 is a flowchart showing a flow of process in the video recorder to record contents on an optical disk.

FIG. 6 is a flowchart showing a flow of process in the video recorder 100 to record contents on an optical disk.

[Step S201] The process determines whether or not the optical disk 1 is mounted on a disk tray of the optical disk 109 and is inserted. When it is determined that the optical disk 1 inserted, the process proceeds to Step S202.

[Step S202] The RFID tag reader 110 is used to read the disk ID 11 from the RFID tag 2 mounted on the optical disk 1. The read disk ID 11 is temporarily stored in the RAM 107, for example.

[Step S203] When a user operation instructs to start dubbing a content from the HDD 108 to the optical disk 109, the process proceeds to Step S204. Otherwise, the process proceeds to Step S208.

[Step S204] The process sequentially reads specified content data recorded on the HDD 108, transfers the content data to the optical disk 109, and starts writing to the optical disk 1. When copy control information inhibits the copy of a content, the process erases (invalidates) the corresponding content data if transferred to the optical disk 1.

[Step S205] When the content is being recorded, the process extracts the index information 12 corresponding to the content from the HDD 108. The process records the index information 12 along with the disk ID 11 read at Step S202 as the disk management information 10 at a specified area in the HDD 108.

[Step S206] The process determines whether or not the end of dubbing is instructed. The process continuously records content data on the optical disk 1 until the end of dubbing is instructed. When the end of dubbing is instructed according to a user operation, the process proceeds to Step S207.

[Step S207] The process stops writing to the optical disk 1.

[Step S208] On the optical disk 1, it is possible to not only write contents already recorded on the HDD 108, but also directly record a broadcast content that is being received. In this case, at Step S208, the process determines whether or not the start of recording is instructed according to a user's input operation or based on the recording reservation information. When the start of recording is instructed, the process proceeds to Step S209. When the start of recording is not instructed, the process returns to Step S203 and awaits an instruction to start dubbing or recording.

[Step S209] The process starts writing content data received by the tuner 101 to the HDD 108.

[Step S210] In a manner similar to Step S103 in FIG. 5, the process obtains the index information 12 about the content. The process records the index information 12 along with the disk ID 11 read at Step S202 as the disk management information 10 at a specified area in the HDD 108.

[Step S211] The process determines whether or not the end of recording is instructed. When the end of recording is instructed in accordance with a user operation or based on the recording reservation information, the process proceeds to Step S207 to stop writing the content data to the optical disk 1.

When the above-mentioned process records the content on the optical disk 1, the content's index information 12 and the disk ID 11 of the optical disk 1 used are all stored as the disk management information 10 in the HDD 108. That is, the video recorder 100 continues to store the disk IDs 11 of all the optical disks 1 to record contents in the apparatus and the index information 12 about the recorded contents.

The index information 12 is automatically generated from the EPG or the EPG-based recording reservation information and is registered to the disk management information 10. This saves user's input operations and increases the usability.

FIG. 7 exemplifies a data structure of the disk management information 10.

As shown in FIG. 7, the disk management information 10 records the disk ID 11 of the optical disk 1 and the index information 12 about the recorded content correspondingly to each other. According to the example in FIG. 7, the index information 12 contains a recording date 12a to have recorded the content on the HDD 108 or the optical disk 1 and a corresponding program title 12b. In addition, the index information 12 may further include a comment to describe details of each content according to a user operation at the time of recording on the HDD 108, for example. The index information 12 may furthermore include a still picture (thumbnail image) captured, generated, and recorded at the start or any time point of the reproduction automatically or manually according to a user's input operation.

The index information 12 may be recorded in the disk management information 10 at the time point of recording the content on the HDD 108. In this case, as shown at the second row in FIG. 7, no data is described in the column for the disk ID 11 until the content is dubbed to the optical disk 1.

Moreover, the disk management information 10 in FIG. 7 contains a recording flag 13 indicating whether or not the content is currently recorded in the HDD 108. The recording flag 13 is set to "1" when the corresponding content is recorded on the HDD 108 and is reset to "0" when that content is erased from the HDD 108. As will be described later, the recording flag 13 can be used when the recording contents of the optical disk 1 are displayed so that the user can be notified of the same content on the optical disk 1 and the HDD 108.

The disk management information 10 may record not only contents recorded by the video recorder 100, but also information about reproduction-only disks in the possession of the user and recording contents of optical disks recorded on the other apparatuses. This makes it possible to fast confirm the recording contents of as many optical disks in the possession of the user as possible.

For example, there may be a case of reproducing an optical disk not registered to the disk management information 10. At the time of reproducing such optical disk, it just needs to register the recording content to the disk management information 10. In this case, all optical disks including reproduction-only ones need to be provided with RFID tags that record disk IDs. A reproduction-only optical disk need not have the identification information that identifies the optical disk itself. Its identification information just needs to be unique to each recorded data (i.e., each stamper type).

Figure 8:
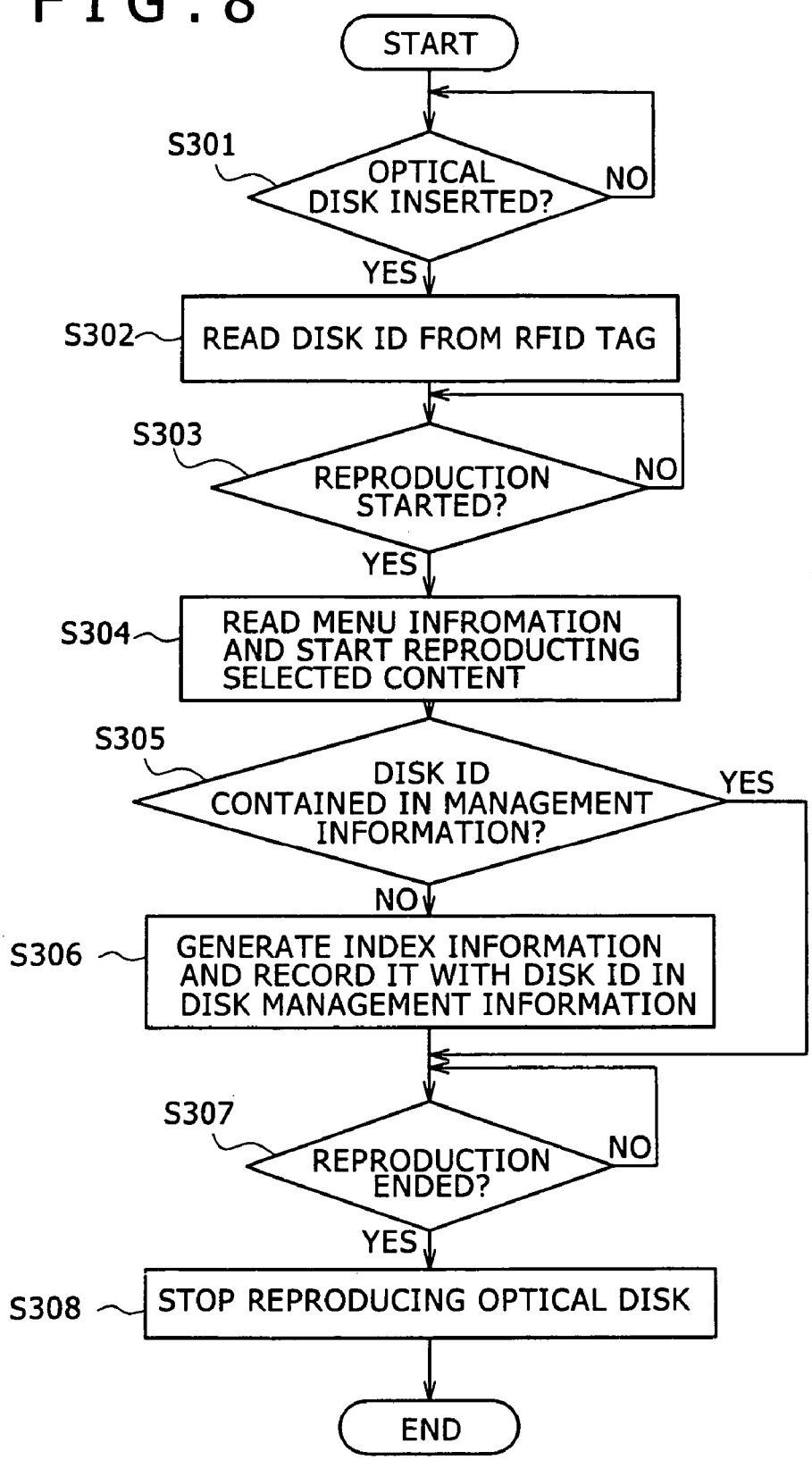
FIG. 8 is a flowchart showing a flow of process in the video recorder to reproduce contents on the optical disk.

FIG. 8 is a flowchart showing a flow of process in the video recorder 100 to reproduce contents on the optical disk 1.

[Step S301] When it is determined that the optical disk 1 is inserted into the optical disk drive 109, the process proceeds to Step S302.

[Step S302] The RFID tag reader 110 is used to read the disk ID 11 from the RFID tag 2 mounted on the optical disk 1. The read disk ID 11 is temporarily stored in the RAM 107, for example.

[Step S303] When the start of reproducing the optical disk 1 is instructed according to a user operation, the process proceeds to Step S304. When an instruction is issued to dub contents from the HDD 108 to the optical disk 1, it just needs to perform the process at Steps S204 through S207 in FIG. 6. When an instruction is issued to start recording broadcast contents to the optical disk 1, it just needs to perform the process at Steps S209 through S211 and S207 in FIG. 6.

[Step S304] The process reads menu information to select a recorded content from the optical disk 1. When the content is selected according to a user's input operation, the process starts reproducing the selected content.

[Step S305] The process references the disk management information 10 in the HDD 108 and determines whether or not the disk ID 11 read at Step S302 is registered. When the disk ID 11 is registered, the process proceeds to Step S307. When the disk ID 11 is not registered, the process proceeds to Step S306.

[Step S306] The process generates the index information 12 about contents recorded on the optical disk 1 from the menu information read at Step S304. The process records the index information 12 corresponding to the disk ID 11 in the disk management information 10.

[Step S307] The process determines whether or not the end of reproduction is instructed. The process continues the reproduction of the optical disk 1 until the end of reproduction is instructed. When a user operation instructs the end of reproduction, the process proceeds to Step S308.

[Step S308] The process stops the reproduction of the optical disk 1.

When the optical disk 1 is not registered to the disk management information 10, reproducing this optical disk 1 records the disk ID 11 of the optical disk 1 and the index information 12 in the disk management information 10 as mentioned above. Accordingly, this makes it possible to confirm the recording contents of the optical disk 1 without mounting it on the video recorder 100 afterwards. The index information 12 generated at Step S306 above can include, for example, a program title, names of an author, a director, and performers, and still pictures (thumbnail images) created by capturing the beginnings of chapters.

Figure 9:
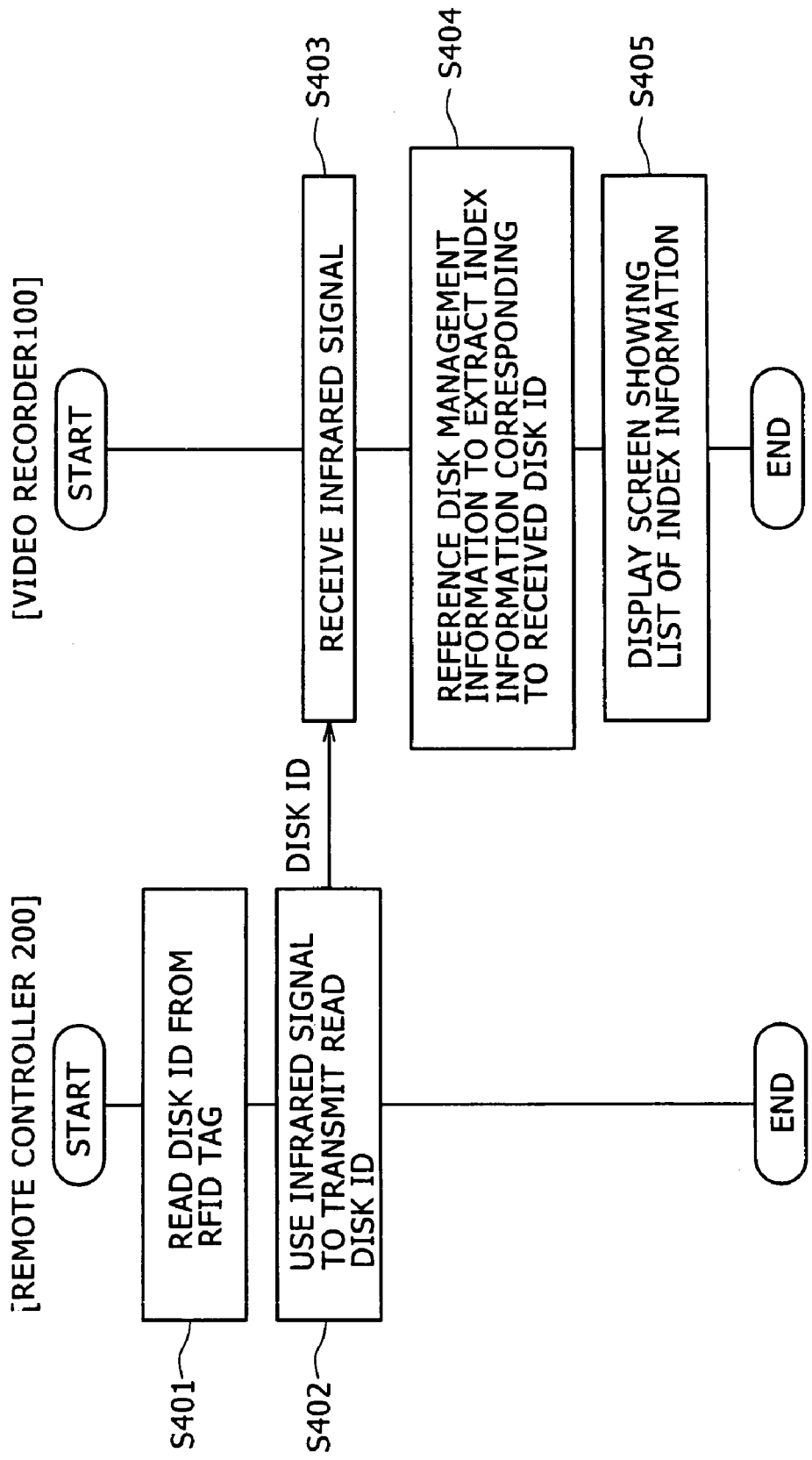
FIG. 9 is a sequence diagram showing a flow of process for a user to confirm contents recorded on the optical disk according to the first embodiment.

The following describes a process for the user to confirm the recording contents of the optical disk 1 available outside the video recorder 100. FIG. 9 is a sequence diagram showing the flow of this process.

[Step S401] The remote controller 200 may be set to an operation mode that reads the RFID tag 2 in accordance with a user operation. In this case, the RFID tag reader 204 generates a signal for reading to start the read operation. When the user places the intended optical disk 1 near the remote controller 200, the RFID tag 2 mounted on the optical disk 1 transmits the disk ID 11 stored in an internal memory device using the power based on a signal radio wave from the remote controller 200. The RFID tag reader 204 of the remote controller 200 receives the transmitted signal. In this manner, the disk ID 11 is read.

[Step S402] When determining the completion of reading the disk ID 11, the CPU 201 transfers the disk ID 11 to the infrared ray transmission portion 206 to transmit the disk ID 11 to the video recorder 100 by means of an infrared signal. When the video recorder 100 does not receive the infrared signal, the following process is not performed. The screen display at Step S405 does not take place. It may be preferable to be able to repeatedly transmit an infrared signal in accordance with user operations.

[Step S403] The video recorder 100 uses the infrared ray reception portion 112 to receive the infrared signal from the remote controller 200 and then starts the process at the next Step S404.

[Step S404] The video recorder 100 references the disk management information 10 recorded in the HDD 108 and extracts all the index information 12 corresponding to the disk ID 11 received at Step S403.

[Step S405] The video recorder 100 displays a list of the extracted index information 12. For example, the video recorder 100 generates an image signal for listing and outputs this signal to the TV receiver 300 via the graphic I/F 103. Alternatively, the video recorder 100 may use its own display apparatus to display the list.

According to the above-mentioned process, the user can confirm the contents recorded on the optical disk 1 without needing to mount the optical disk 1 on the video recorder 100 for reproduction. The video recorder 100 consumes some length of time after the optical disk 1 is mounted on the disk tray until the optical disk 1 is reproduced to display the recorded contents. When the video recorder 100 can record or reproduce a plurality of types of optical disks, the video recorder 100 needs to determine the type of the optical disk before reproducing it and consumes a longer time for this process. By contrast, the above-mentioned process allows the user to fast confirm the content of the optical disk 1. The user can fast find the intended optical disk 1 out of many, greatly improving the usability for users.

The RFID tag 2 mounted on the optical disk 1 stores only the disk ID 11 and is read only. The optical disk 1 is hardly subject to an increase in manufacturing costs. It is possible to provide users with the recordable optical disk 1 at relatively low costs. Further, the RFID tag reader mounted on the remote controller 200 is also read only. Consequently, it is possible to minimize an increase in manufacturing costs and the apparatus size.

The use of the RFID tag 2 as recording means for the disk ID 11 can suppress manufacturing costs of the reader compared to the use of bar codes, for example. The use of the RFID tag 2 can shorten the time to recognize the read data. During data transfer, there is no need to precisely and motionlessly place the position of mounting the RFID tag 2 in front of the reader. This facilitates user operations.

FIG. 7 shows the recording flag 13 described in the disk management information 10. In this case, the process may read the value of the recording flag 13 along with the index information 12 at Step S404 in FIG. 9. At Step S405, the process may determine whether or not the HDD 108 currently contains a list of contents being displayed based on the value of the recording flag 13. This allows the user to confirm that the intended content remains not only in the optical disk 1, but also in the HDD 108. The user can fast reproduce the same content in the HDD 108 of the video recorder 100 without mounting the optical disk 1 on the video recorder 100. This further improves the usability for users.

Second Embodiment

According to the second embodiment, the index information 12 about the optical disk 1 is displayed on a display screen provided for the remote controller 200. For this purpose, data needs to be interchanged between the remote controller 200 and the video recorder 100 as will be described later. Basically, the video recorder 100 and the remote controller 200 may be constructed similarly to those shown in FIGS. 2 and 3. The infrared ray reception portion 112 and the infrared ray transmission portion 206 may be replaced by equivalent circuits capable of transmitting and receiving infrared signals. The disk management information 10 in the video recorder 100 may be recorded according to a process similar to that for the first embodiment.

Figure 10:
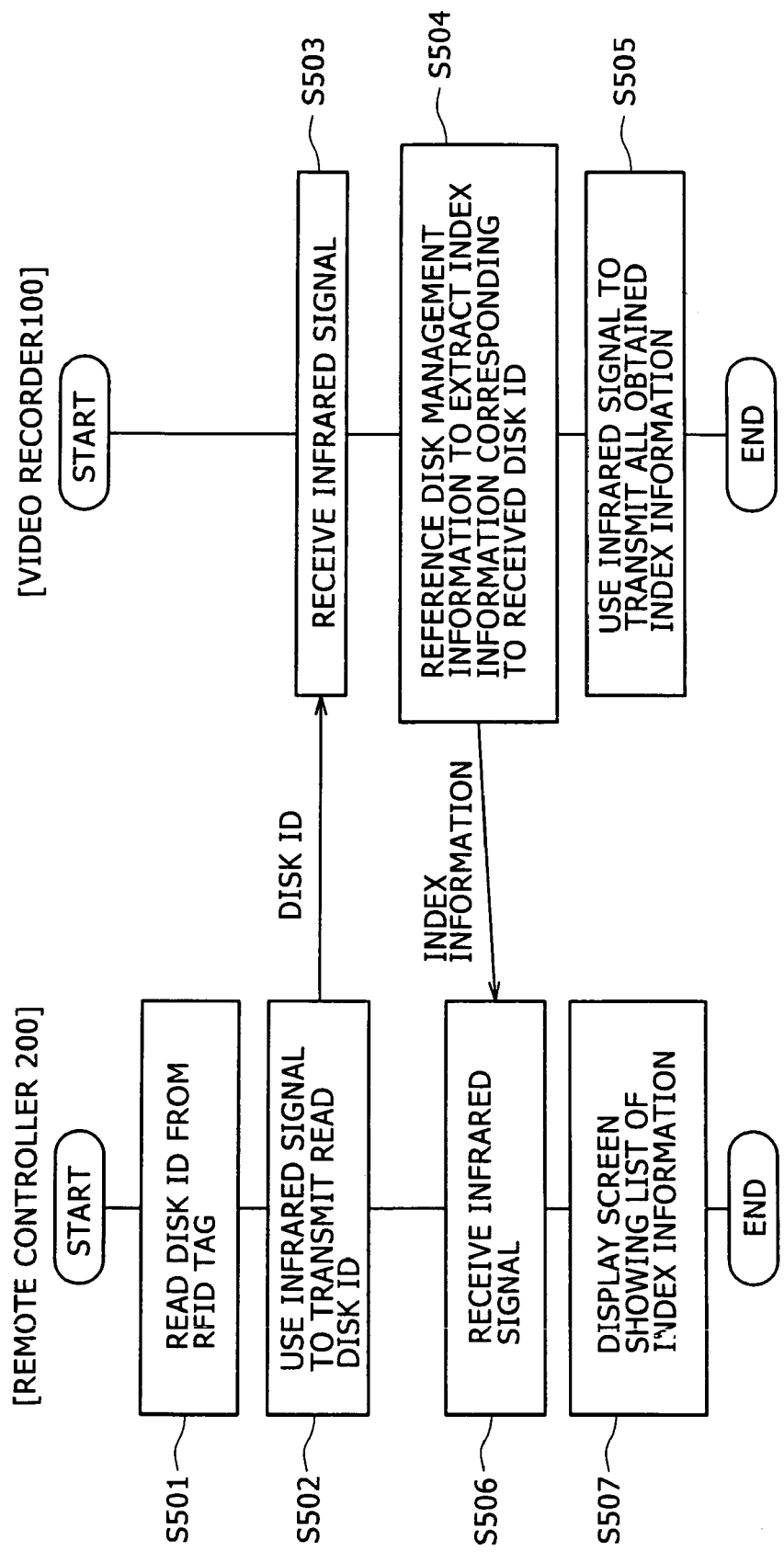
FIG. 10 is a sequence diagram showing a flow of process for a user to confirm contents recorded on the optical disk according to a second embodiment.

FIG. 10 is a sequence diagram showing a flow of process for a user to confirm contents recorded on the optical disk 1 according to the second embodiment.

The process from Steps S501 through S504 is similar to that from Step S401 through S404 in FIG. 9, respectively. That is, the user places the remote controller 200 near the intended optical disk 1. The remote controller 200 reads the disk ID 11 from the RFID tag 2 and transmits the disk ID 11 to the video recorder 100. The video recorder 100 extracts all the index information 12 corresponding to the received disk ID 11 from the disk management information 10.

[Step S505] The video recorder 100 transmits all the extracted index information 12 to the remote controller 200 using an infrared signal.

[Step S506] The remote controller 200 receives the infrared signal from the video recorder 100 to obtain the index information 12.

There may be a case where the index information 12 cannot be received from the video recorder 100, for example, within a specified time from the time the disk ID 11 is transmitted at Step S502. In such case, it may be preferable to alert the user by displaying unsuccessful reception on the display portion 207 and retransmit the disk ID in accordance with a user's input operation. Since an infrared signal is highly directive, the video recorder 100 may not correctly receive infrared signals depending on the way the user holds the remote controller 200. In such case, the above-mentioned function enables the user to more accurately confirm the recording contents of the optical disk 1 in as short a time as possible.

[Step S507] The remote controller 200 allows the display portion 207 to display a list display screen of the received index information 12.

According to the above-mentioned process, the user places the remote controller 200 over the optical disk 1 and then can fast visually check the recording contents using the remote controller 200. The operational feeling for users is further improved. For example, the TV receiver 300 may not be turned on. Alternatively, the video recorder 100 may be installed at least approximately several meters far away from the user, making it difficult for the user to visually check the display screen on the video recorder 100. In these cases, the user can fast visually check the recording content on the remote controller 200 at hand.

Third Embodiment

Figure 11:
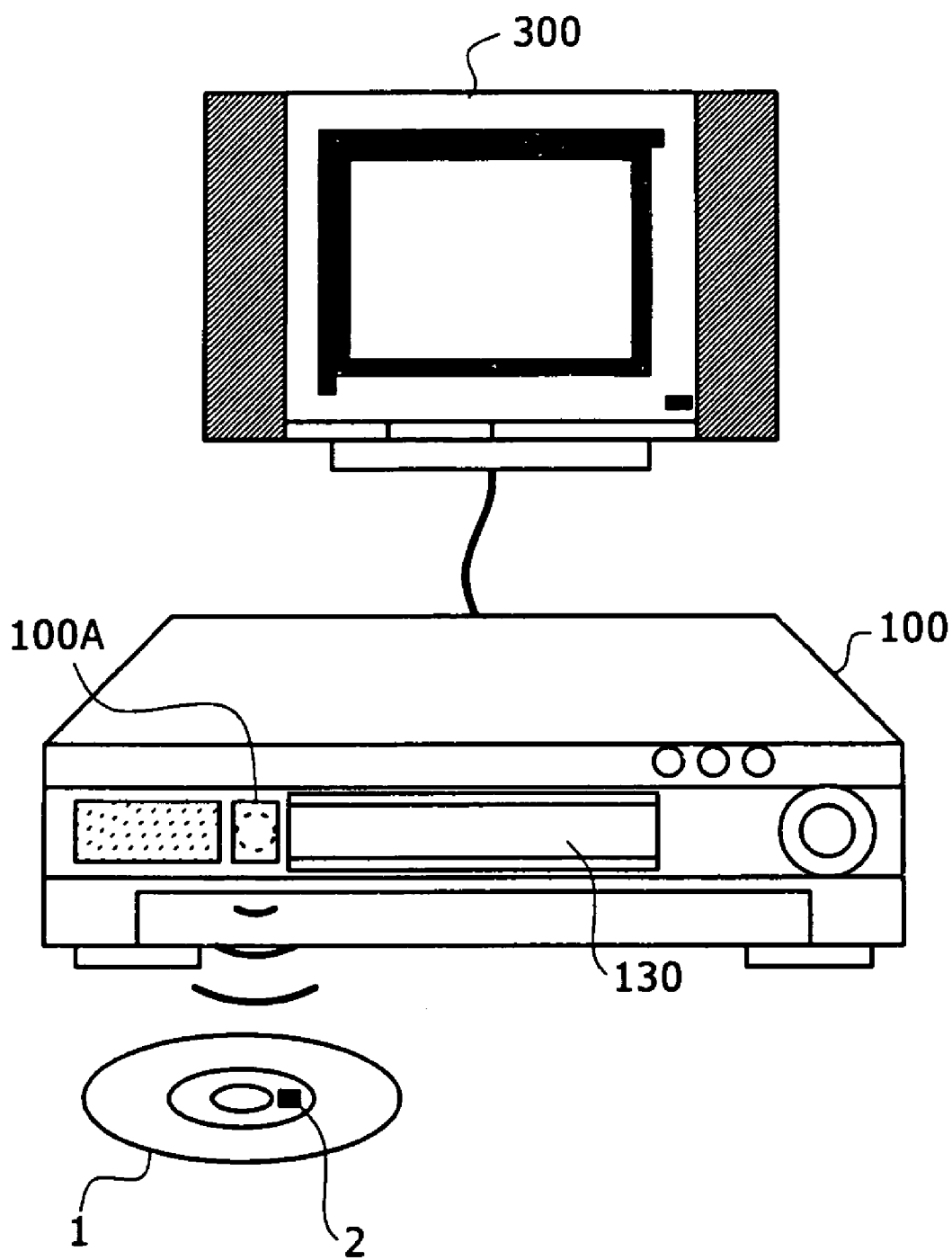
FIG. 11 shows a system configuration of a third embodiment.

FIG. 11 shows a system configuration of a third embodiment.

According to the third embodiment, the user can fast confirm the recording contents of the optical disk 1 only using the video recorder 100 without using the remote controller 200. As shown in FIG. 11, for example, a front panel of the video recorder 100 is provided with an antenna 110a for the RFID tag reader 110. Just placing the optical disk 1 near the video recorder 100 enables the video recorder 100 to read the disk ID 11.

Also in this embodiment, a process similar to that in the first embodiment may be used to record the disk management information 10 in the video recorder 100.

Figure 12:
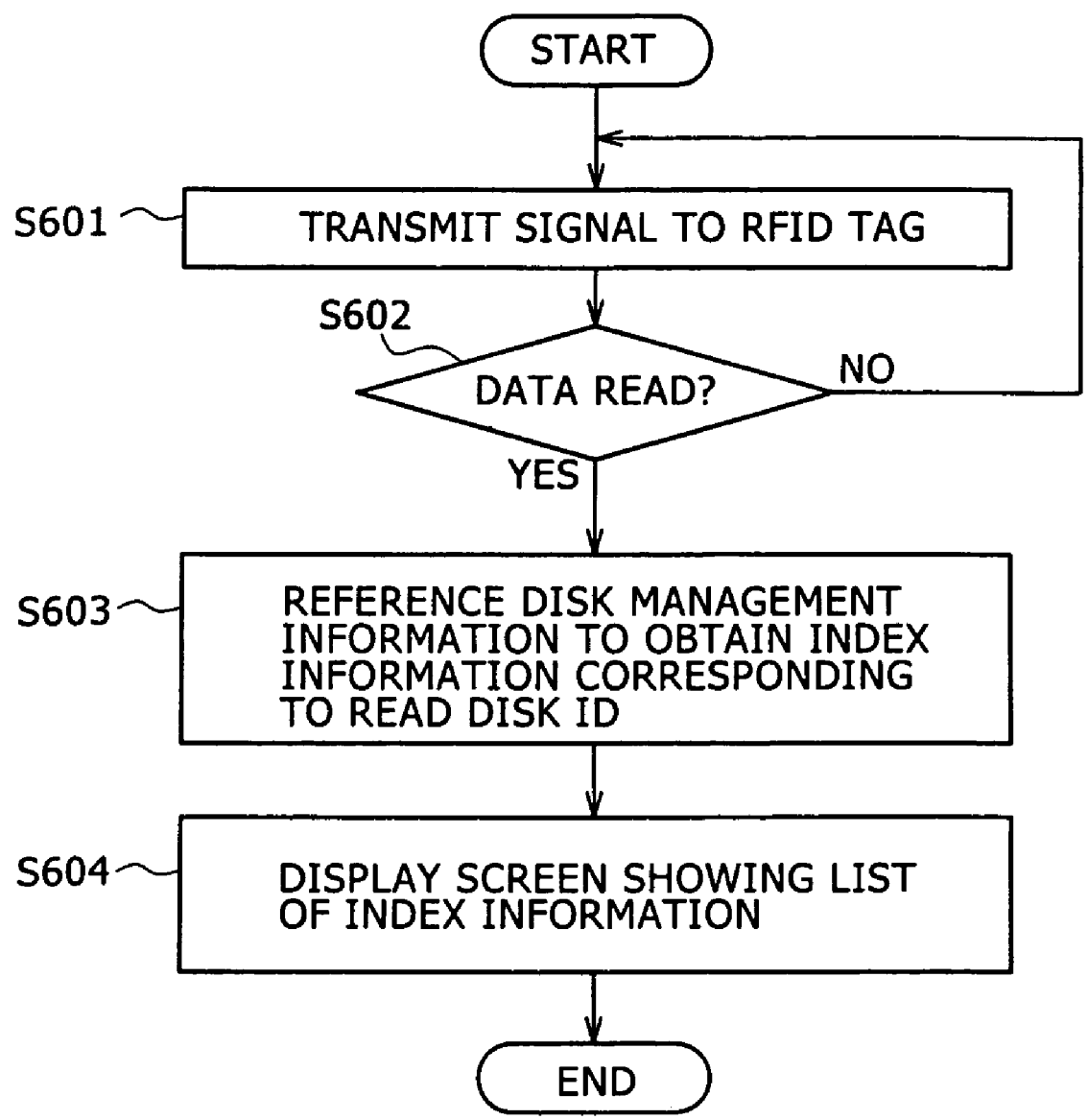
FIG. 12 is a sequence diagram showing a flow of process in the video recorder for a user to confirm contents recorded on the optical disk according to the third embodiment.

FIG. 12 is a sequence diagram showing a flow of process in the video recorder 100 for a user to confirm contents recorded on the optical disk 1 according to the third embodiment.

[Step S601] The video recorder 100 periodically transmits a signal for reading from the antenna 110a of the RFID tag reader 110 several times per second, for example.

[Step S602] Let us consider that the user places the optical disk 1 near the antenna 110a of the RFID tag reader 110. When the RFID tag reader 110 reads the disk ID 11 recorded in the RFID tag 2, the process proceeds to Step S603. Otherwise, the process returns to Step S601.

[Step S603] The process references the disk management information 10 recorded on the HDD 108. The process extracts all the index information 12 corresponding to the disk ID 11 received at Step S602.

[Step S604] The process lists the extracted index information 12. For example, the video recorder 100 generates an image signal for listing and outputs it to the TV receiver 300 via the graphic I/F 103. Alternatively, it may be preferable to display the listing on a display apparatus provided for the video recorder 100 itself.

According to the above-mentioned process, the user does not need to use the remote controller 200 and just needs to place the optical disk 1 near the video recorder 100 to become able to confirm the recording contents of the optical disk 1. When reproducing the optical disk 1, the user approaches the video recorder 100 and becomes able to confirm the recording contents of the optical disk 1. Before mounting the optical disk 1 on the video recorder 100, the user can notice that the optical disk 1 does not record an intended content, for example.

According to the example in FIG. 11, the RFID tag reader 110 is provided on the front panel. Further, for example, the RFID tag reader 110 may be provided on the front of a disk tray 130 for mounting the optical disk 1 or on a disk mounting surface. In this case, the user may not need to intentionally place the optical disk 1 over the RFID tag reader 110. During a process of mounting the optical disk 1 on the disk tray 130 for reproduction, the video recorder 100 can recognize the disk ID 11 and display the corresponding index information 12. Accordingly, the user can confirm the recording content of the optical disk 1 earlier than the method of reproducing the optical disk 1 and displaying the recording contents as practiced in the past. When the mounted optical disk 1 does not record an intended content, for example, the user can promptly replace that optical disk 1 with another optical disk.

In the above-mentioned embodiments, there has been described the special-purpose video recorder for recording video contents. The present invention is not limited thereto. The present invention is applicable to all devices including information processing devices such as personal computers capable of recording and reproducing video contents on a plurality of types of optical disks.

In the above-mentioned embodiments, there has been described the example of managing the index information about contents recorded on the optical disk. In addition, applicable contents to be managed may include audio contents, data files using various application programs, and the like. In this case, the applicable index information may include a file creation date, a last update date, a file name, a file size, and a comment to describe the file content.

The above-mentioned embodiments use the optical disk as a portable recording medium to record contents. Further, it is possible to use magnetic disks, magnetic optical disks, memory cards, magnetic tape, and the like.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disk recording and reproducing apparatus to record and reproduce data using an optical disk, the apparatus comprising:
   a management information storage unit configured to store disk management information relating individual identification information about said optical disk and index information indicating details of a recorded content on said optical disk, wherein said individual identification information is recorded in an RFID tag integrally provided for said optical disk, said index information including a flag indicating whether or not each recorded content on said optical disk is also stored in a fixed recording medium;
   an identification information reader configured to noncontactly read said individual identification information from said RFID tag of said optical disk;
   a display process unit configured to extract said index information from said disk management information, wherein said index information corresponds to said individual identification information read by said identification information reader, and outputting an image signal to display said extracted index information on a screen, said display process unit also displaying said flag of said index information;
   a broadcast information acquisition unit configured to acquire information indicating details of a content to be recorded on the optical disk, wherein said index information includes information acquired by said broadcast information acquisition unit;
   a management information registration unit configured to register individual identification information and the index information relating thereto into said disk management information when content is recorded on the disk; and
   the fixed recording medium, located inside the apparatus, configured to record content and corresponding index information thereon,
   wherein said management information registration unit records individual identification information read from the optical disk and the index information of content recorded on said fixed recording medium in a corresponding relationship when recorded content on the fixed recording medium is read from said fixed recording medium and is recorded into the optical disk.

2. The optical disk recording and reproducing apparatus according to claim 1 further comprising:
   an identification information internal reader configured to noncontactly read said individual identification information from said RFID tag of said optical disk inserted into an inside of said optical disk recording and reproducing apparatus, wherein said individual identification information is read by said identification information internal reader.

3. The optical disk recording and reproducing apparatus according to claim 2 further comprising:
   a broadcast receiver configured to receive the content via a broadcast radio wave,
   wherein, when the content received by said broadcast receiver is to be recorded on said optical disk, said management information registration unit generates said index information based on information about said content acquired by said broadcast information acquisition unit and registers said index information to said disk management information.

4. The optical disk recording and reproducing apparatus according to claim 1 further comprising:
   a broadcast receiver configured to receive the content via a broadcast radio wave; and
   an index information generator configured to generate, when recording the content received by said broadcast receiver on said fixed recording medium, said index information based on information about said content acquired by said broadcast information acquisition unit and recording said index information on said fixed recording medium.

5. The optical disk recording and reproducing apparatus according to claim 2,
wherein, also when reproducing the content recorded on said inserted optical disk, said management information registration unit registers, to said disk management information, said index information about said content and said individual identification information read by said identification information internal reader from said optical disk correspondingly to each other.

6. An optical disk recording and reproducing apparatus to record and reproduce data using an optical disk comprising:
a management information storage unit configured to store disk management information to maintain correspondence between individual identification information about said optical disk and index information indicating details of the content recorded on said optical disk, wherein said individual identification information is recorded in an RFID tag integrally provided for said optical disk, said index information including a flag indicating whether or not each recorded content on said optical disk is also stored in a fixed recording medium;
a signal receiver configured to receive a wireless signal from an external remote controller which remotely controls operations of said optical disk recording and reproducing apparatus;
a display process unit configured to receive said individual identification information read by said remote controller from said RFID tag on said optical disk by way of said signal receiver, extracting said index information corresponding to said individual identification information from said disk management information, and outputting an image signal to display said extracted index information on a screen, said display process unit also displaying said flag of said index information;
a broadcast information acquisition unit configured to acquire information indicating details of a content to be recorded on the optical disk;
a management information registration unit configured to register individual identification information and the index information relating thereto into said disk management information when content is recorded on the disk; and
the fixed recording medium, located inside the apparatus, configured to record content and corresponding index information thereon,
wherein said management information registration unit records individual identification information read from the optical disk and the index information of content recorded on said fixed recording medium in a corresponding relationship when recorded content on the fixed recording medium is read from said fixed recording medium and is recorded into the optical disk.

7. The optical disk recording and reproducing apparatus according to claim 6 further comprising:
an identification information internal reader configured to noncontactly read said individual identification information from said RFID tag of said optical disk inserted into an inside of said optical disk recording and reproducing apparatus, wherein said individual identification information is read by said identification information internal reader.

8. An optical disk recording and reproducing apparatus to record and reproduce data using an optical disk comprising:

a management information storage unit configured to store disk management information to maintain correspondence between individual identification information about said optical disk and index information indicating details of a recorded content on said optical disk, wherein said individual identification information is recorded in an RFID tag integrally provided for said optical disk, said index information including a flag indicating whether or not each recorded content on said optical disk is also stored in a fixed recording medium;
a wireless communication unit configured to perform wireless communication with an external remote controller which remotely controls operations of said optical disk recording and reproducing apparatus;
an information retrieval unit configured to receive said individual identification information read by said remote controller from said RFID tag on said optical disk by way of said wireless communication unit, to extract said index information corresponding to said individual identification information from said disk management information, and to allow said wireless communication unit to transmit said extracted index information to said remote controller, said wireless communication unit also transmitting said flag of said index information to said remote controller; and
a broadcast information acquisition unit configured to acquire information indicating details of a content to be recorded on the optical disk;
a management information registration unit configured to register individual identification information and the index information relating thereto into said disk management information when content is recorded on the disk; and
the fixed recording medium, located inside the apparatus, configured to record content and corresponding index information thereon,
wherein said management information registration unit records individual identification information read from the optical disk and the index information of content recorded on said fixed recording medium in a corresponding relationship when recorded content on the fixed recording medium is read from said fixed recording medium and is recorded into the optical disk.

9. The optical disk recording and reproducing apparatus according to claim 8 further comprising:
an identification information internal reader configured to noncontactly read said individual identification information from said RFID tag of said optical disk inserted into an inside of said optical disk recording and reproducing apparatus, wherein said individual identification information is read by said identification information internal reader.

10. A content management method of managing a recorded content on an optical disk for an optical disk recording and reproducing apparatus to record or reproduce optical disks, said method comprising:
storing disk management information to maintain correspondence between individual identification information about said optical disk and index information indicating details of the recorded content on said optical disk, wherein said individual identification information is recorded in an RFID tag integrally provided for said optical disk, said index information including a flag indicating whether or not each recorded content on said optical disk is also stored in a fixed recording medium;

noncontactly reading said individual identification information from said RFID tag of said externally available optical disk;

extracting said index information from said disk management information, wherein said index information corresponds to said individual identification information read from said RFID tag;

outputting an image signal to display said extracted index information on a screen, said outputting including displaying said flag of said index information; and acquiring information indicating details of a content to be recorded on the optical disk;

registering individual identification information and the index information relating thereto into said disk management information when content is recorded on the disk; and recording individual identification information read from the optical disk and the index information of content recorded on the fixed recording medium located inside the apparatus in a corresponding relationship when recorded content on the fixed recording medium is read from said fixed recording medium and is recorded into the optical disk.

11. A content management method of managing a recorded content on an optical disk for an optical disk recording and reproducing apparatus to record or reproduce optical disks, said method comprising:

acquiring information indicating details of a content to be recorded on the optical disk;

storing disk management information to maintain correspondence between individual identification information about said optical disk and index information indicating details of the recorded content on said optical disk, wherein said individual identification information is recorded in an RFID tag integrally provided for said optical disk, said index information including a flag indicating whether or not each recorded content on said optical disk is also stored in a fixed recording medium;

noncontactly reading by a remote controller said individual identification information from said RFID tag of said optical disk;

wirelessly transmitting said individual identification information to said optical disk recording and reproducing apparatus;

extracting said index information from said disk management information, wherein said index information corresponds to said individual identification information transmitted from said remote controller;

wirelessly transmitting said index information extracted at said information retrieval step to said remote controller;

displaying said index information transmitted from said optical disk recording and reproducing apparatus on a screen, said displaying including displaying said flag of said index information;

registering individual identification information and the index information relating thereto into said disk management information when content is recorded on the disk; and recording individual identification information read from the optical disk and the index information of content recorded on the fixed recording medium located inside the apparatus in a corresponding relationship when recorded content on the fixed recording medium is read from said fixed recording medium and is recorded into the optical disk.

\* \* \* \* \*